Aug. 25, 1970 F. J. HODGE 3,525,930

DROPOUT COUNTER

Filed March 28, 1968 3 Sheets-Sheet 1

INVENTOR:
Frederick J. Hodge

By Smyth, Roston & Pavitt
ATTORNEYS

Aug. 25, 1970 F. J. HODGE 3,525,930

DROPOUT COUNTER

Filed March 28, 1968 3 Sheets-Sheet 2

INVENTOR:
Frederick J. Hodge

By Smyth, Roston & Pavitt
ATTORNEYS

INVENTOR:
Frederick J. Hodge
By Smyth, Roston & Pavitt
ATTORNEYS

United States Patent Office 3,525,930
Patented Aug. 25, 1970

3,525,930
DROPOUT COUNTER

Frederick J. Hodge, Camarillo, Calif., assignor to Minnesota Mining and Manufacturing Company, St. Paul, Minn.

Filed Mar. 28, 1968, Ser. No. 716,783
Int Cl. G01r 33/00
U.S. Cl. 324—34 27 Claims

ABSTRACT OF THE DISCLOSURE

The present invention relates to a tape quality indicator for producing an output record of the quality of magnetic recording tape which is used for recording information such as video information. Specifically, the tape quality indicator provides for an instantaneous continuous record of the dropouts per minute reproduced along with the information on the tape and modifies this record of dropouts per minute by subjective factors relating to the learning time and forgetting time of the average viewer of the video information on the tape. The invention includes means for automatically resetting the instrument when the dropouts per minute exceed a predetermined value. The invention also includes means for calibrating the tape quality indicator to indicate tape quality of a particular value.

Magnetic tape has become an increasingly important medium for the recording and reproduction of information. For example, video information is now recorded almost exclusively on magnetic tape for replay at a later time. These video tapes may be replayed many times before the tape is erased and the erased tape may be used again for the recording of additional information. The quality of the tape used for recording varies in accordance with different manufacturers and with the particular production run of the manufacturer. Also, as the tape is used, the quality of the tape diminishes.

Generally, the quality of the tape is related to the imperfections in the tape. These imperfections may cause a momentary loss of reproduced signal on the tape. The loss of signal may occur during the recording or reproducing process and the loss of signal is generally referred to as "dropout." The dropout lasts for some period of time and when the duration of the dropout is long enough to produces either flecks or streaks in the reproduced picture. Generally, dropouts lasting greater than 5 microseconds are visible to the viewer.

Very high quality tape may exhibit only two or three of these dropouts per minute, but many tapes have dropout rates of five or ten per minute and sometimes occasional bursts, which consist of a plurality of dropouts, may occur so as to increase the rate greatly. It is, therefore, valuable to evaluate tapes so as to determine their dropout rates and when the impairment of the tape is sufficient, either portions of the tape are removed or the tape is completely discarded. There have been attempts made to monitor the quality of tapes, but generally these attempts merely count the number of dropouts over selected intervals to give a dropout profile. This type of tape evaluation is not reproduceable in that the same tape gives a different dropout profile with each evaluation because the position of the measured intervals varies upon each evaluation of the tape. Also, merely measuring the number of dropouts per minute does not provide for an accurate evaluation of the subjective impairment produced by the dropouts to an average viewer.

It has been determined that the subjective impairment produced by dropouts varies in accordance with several parameters. For example, assuming dropouts are occurring at a particular rate, the impairmen to the viewer increases when the duration of each dropout is increased, even though the number of dropouts per minute is kept constant. Since the duration of the dropouts follows a random pattern, it is possible to ignore the duration and base the tape evaluation on the dropout rate alone. Also, if the duration of the dropouts is held constant but the repetition rate is increased, the impairment to the viewer increases.

Although the impairment increases for increases in both the duration and the repetition rate of the dropouts, the impairment does not follow a linear relationship in accordance with the increase of duration or repetition. Actually, there are learning and forgetting times for the average viewer so that if the dropouts are sustained, an appreciable buildup of impairment takes place, even though the duration and repetition rate of the dropouts remains constant. A learning time of approximately 16 seconds has been found to be typical for impairment buildup, but this varies in accordance with the repetition rate of the dropouts. Also, the average viewer tends to forget dropouts past a certain time and it has been determined that a remembering time of approximately 30 seconds was found to be average for the impairment to be unaffected by previous events, but again this varies in accordance with the repetition rate of the dropouts. As indicated above, we may ignore the variations in duration of the dropouts.

It is to be appreciated, therefore, that any device for analyzing the subjective impairment produced by dropouts should include factors relating to this learning and forgetting time for the average viewer. Also, it would be desirable that the output indication be a continuous indication of the subjective impairment so that the record of the quality of the tape may be reproduceable. Therefore, the present invention provides for an instantaneous continuous indication of the dropouts per minute, which indication is qualified by the factors relating to learning and forgetting time of the average viewer.

In producing this continuous indication, the present invention includes means for detecting the presence of dropouts when the dropouts have a particular minimum duration. Specifically, the present invention detects dropouts greater than 5 microseconds. Although the average dropout less than 5 microseconds does not affect the picture so as to be visible to the viewer, dropouts which are less than 5 microseconds long which occur during sync will affect the picture. Therefore, some dropouts which will affect the picture are not detected. However, other dropouts which are detected by the detector of the present invention may actually be recovered by the reproducing equipment without impairment. The value of 5 microseconds is chosen since this value provides for a balance of the dropouts not detected but visible to those detected but recovered, and these two values tend to compensate for each other so that the output indication does accurately reflect the actual subjective impairment of the magnetic recording tape.

Once the dropouts above 5 microseconds are detected, these dropouts are used to charge a double integral circuit so that the output signal from the double integral circuit modifies the dropout rate in accordance with the variable learning and forgetting factors described above. As an example, the present invention uses a pair of capacitors with the first capacitor charged in accordance with the occurrence of a dropout and the second capacitor charged in accordance with the occurrence of a dropout and, in addition, in accordance with the level of the charge on the first capacitor. The charge and discharge times for the double integral circuit approximate the factors of learning and forgetting for the average viewer.

One problem, however, which has occurred, is that when dropouts exceed a certain rate, the double integral circuit is charged to a high value and it requires a relatively long period of time for the double integral circuit to discharge. This does not actually reflect the subjective impairment of the viewer since the viewer tends to forget dropouts which occur past 30 seconds. Also, the discharging over a long period masks the evaluation of the tape immediately subsequent to the dropouts over the certain rate. Since the bad portions of the tape may be removed, it is desirable to know exactly how much tape to cut out. The present invention, therefore, includes means to automatically reset the double integral circuits by discharging the capacitors once the dropouts exceed a predetermined rate. In this way, the actual output indication more accurately reflects the subjective impairment to an average viewer once the bad portions of the tape are removed.

The output from the double integral circuits may be used to produce an output recording on a chart recorder so that a physical record may be produced of the subjective impairment. This physical record may be produced as the information on the tape is being reproduced for broadcast to the home viewers. Therefore, each time the tape is used, the physical record of the impairment of the tape is recorded and this physical record may be placed with the tape so that before any subsequent reproductions of the information on the tape is broadcasted or before the tape is used to record new information, the subjective impairment to the average viewer is available for inspection so as to determine whether the tape should be reused. Also, the present invention may be used to evaluate new tapes.

In order to more fully use the tape quality indicator of the present invention, means must be provided so that each tape handling facility may calibrate the tape output indicator of the present invention to its particular standards. For example, some broadcast stations may accept the use of poorer quality tapes than others. Therefore, the present invention includes means for calibrating the tape quality indicator of the present invention so as to set the level of the dropout which is to be deteced and also to calibrate the recording of the number of dropouts per minute.

The present invention also includes means to provide for a relatively constant output signal from the tape for application to the detector so as to compensate for variations in the level of signal recorded on different tapes. The invention also includes the use of a constant current pulse signal to be applied to the double integral circuit. The invention includes other aspects which will become apparent with reference to the following description and drawings wherein.

Figures 1, 3:
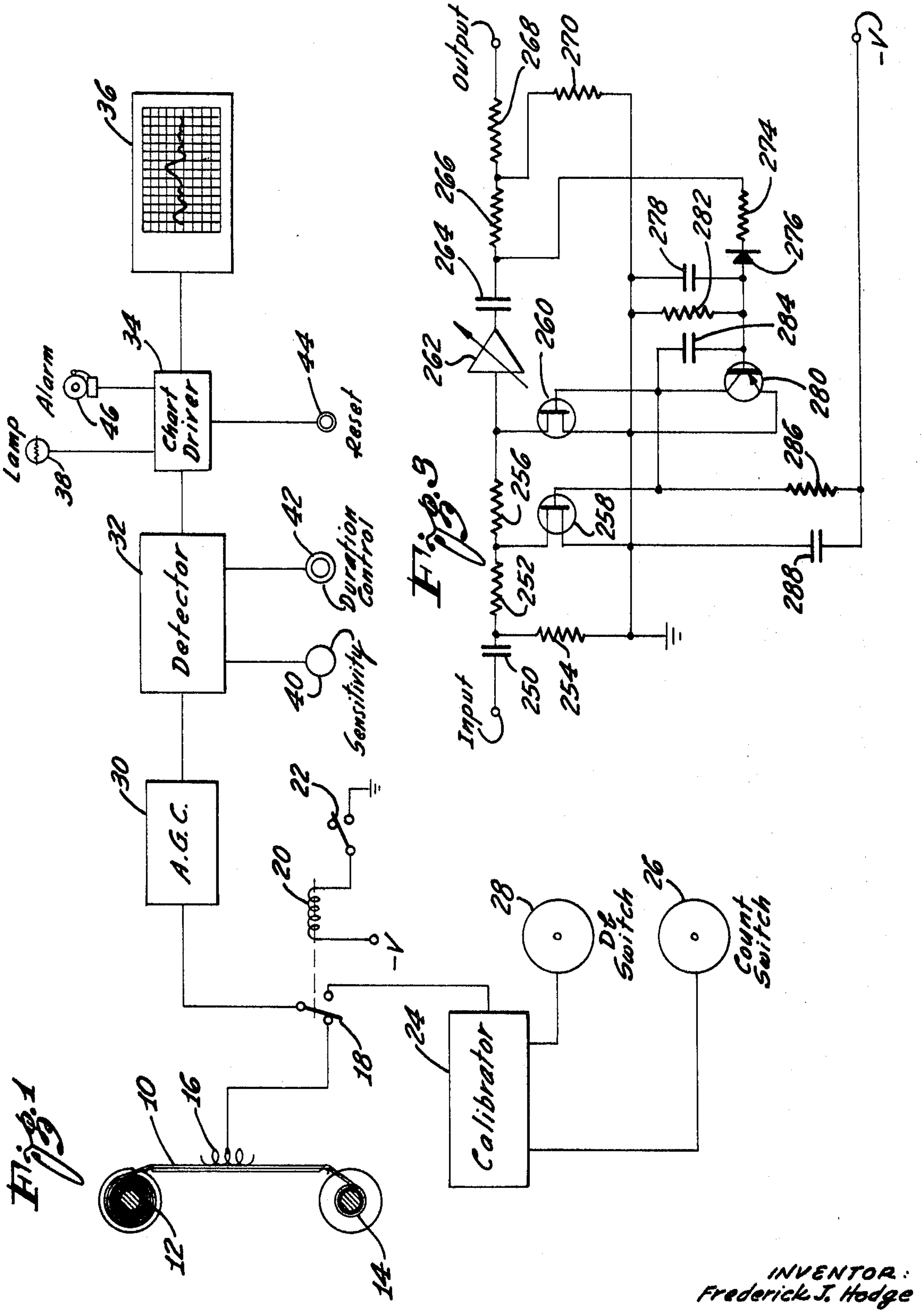
FIG. 1 illustrates a block diagram of the tape quality indicator of the present invention.
FIG. 3 is a schematic drawing of the automatic gain control portion of the block diagram of FIG. 1.

Before evaluating the system of the present invention, the subjective nature of dropout disturbance must be defined in greater depth. It has been recognized that a means of measuring this subjective nature in order to evaluate performance of tapes is a desirable item and the present invention is directed to an apparatus for providing such a measurement. However, the distinction that must be made is between actual dropouts and those disturbances which produce an impairment of the reproduced picture. In this application only those disturbances which produce impairment in the reproduced picture are considered to be dropouts which are measured by the tape quality indicator of the present invention.

The degree of the dropout varies greatly in accordance with machine and tape parameters, but it is desirable that the subjective disturbance produced by the dropout be measured on the basis of the level of impairment to an average observer. The specific impairment of the dropout is dependent upon such factors as the duration of the dropout, the average frequency of the dropout and the depth of the dropout.

In the evaluation of many tapes, it has been found that even in the worst tapes no actual single dropout lasted for as much as 50 microseconds and almost all dropouts were under 25 microseconds. Although bursts of dropouts give the appearance of longer single dropouts, actually no single dropout was greater than a 50-microsecond duration, as indicated above.

Tests have been conducted where controlled bursts of dropouts and single random pulses were used to interrupt the signal which were being reproduced. The picture which was produced with these controlled dropouts was viewed by groups of observers who then rated the quality of the picture. The results of the tests show that the degree of impairment of the picture was related to both the rate and duration of the dropouts as well as the period of time over which the dropouts continue and the length of time since the last disturbances.

Since the degree of impairment is related to the length of time since the last disturbance, this indicates that there is a "forgiveness factor" or a forgetting time involved in the subjective impairment to a viewer. Also, since the impairment is related to the period of time over which the dropouts continue, this indicates that there is an "impairment buildup" or learning time involved in the subjective impairment. These above indicated factors indicate that both the instantaneous rate of the dropout and the length of time since the last disturbance determine whether the dropout is sufficient so as to distract the viewer.

The results of the test indicate that the typical viewer will have an average learning time of approximately 16 seconds for an impairment buildup and the typical viewer will have an average forgetting time of 30 seconds for the disturbance still to be remembered by the viewer. Actually, the learning and forgetting times vary in accordance with the repetition rate for the dropouts. Since it is desirable that these factors be included in any tape quality indicator, the present invention produces a physical record of the dropout which record has a readout in accordance with the instantaneous level of the dropouts and wherein the readout is varied in accordance with a learning curve and a foregetting curve.

The present invention, therefore, counts all dropouts, large and small, above a predetermined minimum level and weighs the count according to the subjective factors of visual impairments and presents a continuous graphic display of this visual impairment. The output display is continuous and instantaneous rather than only at specific mechanical print points as with prior art systems.

The first prior art attempts to evaluate the impairment of the tape generally employed various methods of digital counting. Most of these prior art systems used digital printers but a problem with printer-type devices is that counters of reasonable economic feasibility cannot count faster than 25 counts per second or one dropout per frame. These systems, therefore, cannot analyze sudden bursts. Another prior art system divided the count or defined the dropout in terms of some particular period. However, this type of system is not repeatable and does not provide for a continuous record of the dropout.

Since the dropout disturbances are generally random processes, it is much more realistic to evaluate the disturbances using an instantaneous continuous record. The present invention, therefore, actually evaluates the subjective impairment as it is counting the dropout. This is because the dropout count is automatically integrated as a function of the dropout rate. The discharge rate of the count is based on the foregetting time factors and varies automatically from 14 to 30 seconds in accordance with the dropout rate. The charge rate is based on the learning time and varies automatically from 10 to 20 seconds.

Since the discharge rate is related to the actual charge for very high dropout rates, the discharge rate could be quite a bit greater than 30 seconds. Since the forgiveness factor indicates that the viewer forgets the nature of the dropouts past 30 seconds, it is desirable to include some means of discharging more rapidly for large dropouts. Therefore, the present invention includes means for discharging the integrator once the dropout rate exceeds a predetermined value. These large values indicate the poorest portions of the tape so, at the same time the integrator is discharged, the present invention includes means for producing a separate output indication at these peak values.

In order to detect the dropout, a detector is used which may be of the type shown in application Ser. No. 507,210, filed No. 10, 1965, having Frederick J. Hodge and Ralph R. Barclay as the inventors and assigned to the same assignee as the instant case. The detectors used in the present invention and that of the copending application are substantially identical except for the sensitivity. For dropout compensation the detector should be slightly oversensitive, thus assuring replacement of all visible dropout. Under these conditions, the detector will fire on some amplitude disturbances which are not visible as dropout. The tape quality indicator of the present invention should be set so as to detect only dropouts which are visible.

Therefore, the sensitivity of the detector would be set so as to detect dropouts of a particular duration, for example, 5 microseconds, which duration is the point at which the dropouts become visible. Although some dropouts which would be visible are missed by setting the level of the detector to only detect dropouts greater than 5 microseconds, other dropouts which are detected would not actually produce a visual impairment. The choice of the threshold of 5 microseconds produces a situation where the number of visible dropouts missed approximately equals the number of non-visible disturbances counted falsely. This produces an average which is substantially accurate.

The use of the tape quality indicator of the present invention is particularly important because it is now common practice to use dropout compensation. However, because of the use of dropout compensation, many tapes are used beyond the level which would be considered prudent by operating the tape quality indicator of the present invention and monitoring actual video tape playback The chart record of the tape quality may be stored with the video tape so that a ready record is available of the performance of that particular roll of tape. This record may be assessed before reuse of the tape for new program material or playback of already recorded program material. If used for new program material, bad areas may be cut out before valuable program material is lost by recording this poor quality area.

The tape quality indicator of the present invention may be used to determine a level of disturbance consistent with particular house practice. This may be done by visually analyzing the degree of disturbance in known program material and correlating it with the record of that program material. By evaluating a group of such known program material an acceptable number of burst peaks, an average maximum level may be established. After this, all tape may be evaluated against this reference without considering the subjective attitude of a particular operator.

In the block diagram of FIG. 1, a tape 10 is shown being transported between reels 12 and 14. The information on the tape is being replayed by a head 16. The information is fed through a switch 18 which is normally in the position shown. The switch 18 may also be driven to the opposite position using a solenoid 20 which is controlled by a switch 22. When the switch 18 is controlled to the position opposite to that shown in FIG. 1 by the solenoid 20, the input to the switch is from a calibrator 24. The calibrator 24 produces an output signal which simulates a tape output and includes a predetermined quantity of dropout information. For example, the number of dropouts per minute from the calibrator 24 would be controlled by a count switch 26 and the level of the dropout below the normal level would be controlled by a db switch 28.

The output from the switch 18 passes through an AGC circuit 30. The AGC circuit is used to stabilize the input to the detector but, of course, does not affect rapid changes in level such as dropout. The output from the AGC circuit 30 is fed to a detector 32 which may be of the type shown in copending application Ser. No. 507,210. The detector is set to detect all dropouts greater than a particular duration which duration is specifically chosen to be 5 microseconds. Also, the detector is set to detect dropouts which have a minimum level of a particular amount below the average level of the signal.

The output from the detector is fed to a chart driver 34 which in turn drives a chart recorder 36. The chart driver 34 may also include other outputs such as a lamp 38 which lights up each time a dropout occurs. This light 38 may also be used to calibrate the tape quality indicator of the present invention. Specifically, the detector 32 may include means for adjusting the sensitivity such as sensitivity control means 40. During calibration, the input to the AGC is controlled by the switch 22 to be from the calibrator 24 and the db switch 28 is adjusted to the desired sensitivity level. The sensitivity control 40 is then controlled so as to just produce an output indication from the lamp 38. This calibrates the tape quality indicator to be sensitive to dropouts having at least a level as controlled by the db switch 28. The detector 32 may also include a control 42 to control the minimum duration of the dropout to be detected.

In addition to the above, the chart driver 34 also includes a reset button 44. The reset button 44 manually discharges an integration circuit within the chart driver 34. As indicated above, the chart driver also includes means for automatically discharging the double integration circuit so as to insure that the output indication recorded on the chart 36 accurately reflects the subjective impairment of the dropouts to an average viewer. The double integration circuit in the chart driver 34 is reset when the dropout rate is higher than a particular predetermined level. At that time it may also be desirable to provide an additional output indication to the operator of the tape quality indicator or to record an output signal on a track on the tape which is being analyzed. This additional output signal is provided at an alarm terminal 46.

Figure 2:
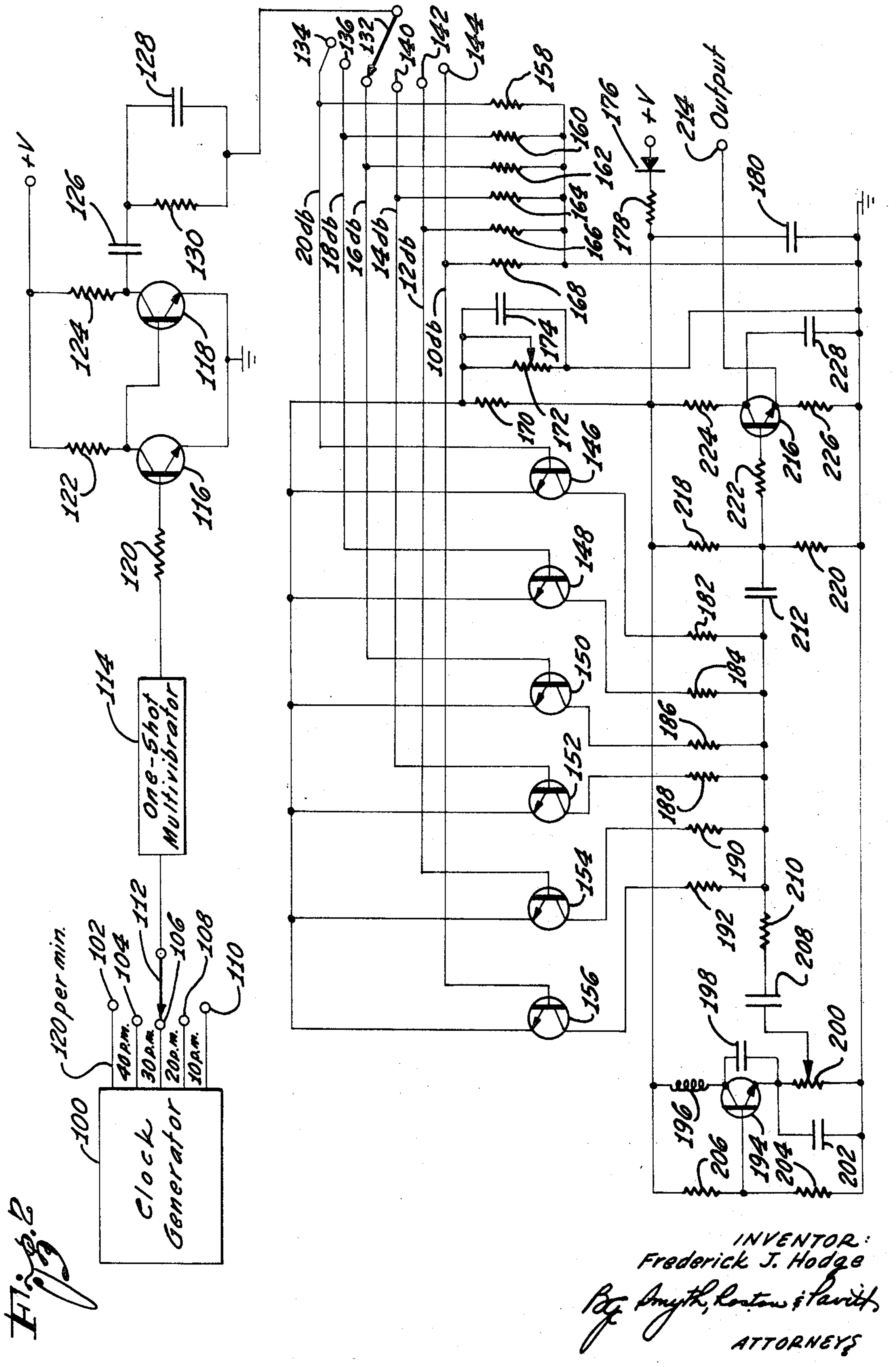
FIG. 2 is a schematic drawing of the calibration portion of the block diagram of FIG. 1.

As explained above with reference to FIG. 1, the input to the tape quality indicator may be either from the tape itself during the evaluation of the tape or may be from a calibrator 24 prior to the evaluation of the tape so as to calibrate the tape quality indicator. A calibrator which is used for the calibrator 24 may be of the type shown in FIG. 2. In FIG. 2, the calibrator includes a clock generator 100 which has a plurality of output terminals 102 to 110, which output terminals supply clock pulses varying from 120 pulses per minute down to 10 pulses per minute. The terminals 102 to 110 form fixed contacts of a switch and the desired pulse rate is selected using a movable contact 112.

The output from the clock generator 100 is applied through the movable contact 112 to a one-shot multivibrator 114. The one-shot multivibrator 114 produces pulses having a very accurately fixed duration. The output from the one-shot multivibrator 114 is then applied to a pulse amplifier including a pair of transistors 116 and 118. Specifically, the output from the one-shot multivibrator 114 is coupled through a resistor 120 to the base of the transistor 116 and resistors 122 and 124 are connected between the collectors of the transistors 116 and 118 and a source of positive voltage.

The output from the pulse amplifier is coupled through a current limiter including capacitors 126 and 128 and resistor 130. The pulses produced by the clock generator 100, therefore, are made definite as to duration by the one-shot multivibrator 114, are amplified by the pulse amplifier and then limited so that a pulse signal having pulses of a predetermined duration and amplitude is produced. This pulse signal is fed through a movable contact 132 to a plurality of fixed contacts 134 through 144. As will be seen, these fixed contacts represent various db levels in an output signal.

Specifically, the pulse is fed through the movable contact 132 and one of the fixed contacts 134 to 144 to one of a series of transistors 146 to 156. The inputs to the transistors are biased by resistors 158 through 168. The emitters of the transistors 146 to 156 are coupled to a bias point controlled by a circuit including resistor 170, potentiometer 172 and capacitor 174. The potentiometer 172 is connected as a rheostat and the adjustment of the rheostat provides for a balance in the operation of the transistors. The resistor 170 is connected to a source of plus voltage.

A diode 176 insures the proper direction for the current from the source of voltage and a resistor 178 and capacitor 180 provide filtering of the source of plus voltage. The collectors of the transistors 146 through 156 are coupled through a plurality of resistors 182 to 192 to a common point. These resistors all have different values and specifically the values are provided so that the resistors attenuate different amounts, which amounts are predetermined and vary from 20 to 10 dbs.

An oscillator is provided by the circuit including the transistor 194, the inductor 196, the capacitor 198, the potentiometer 200, the capacitor 202 and bias resistors 204 and 206, and specifically the frequency of the output signal from the oscillator may be 5 megacycles. The output from the 5-megacycle oscillator is taken through capacitor 208 and resistor 210 and is supplied to the common point to which the resistors 182 through 192 are connected. The transistors 146 through 156 operate as switches and the transistors are controlled in accordance with the position of the movable contact arm 132 and the appearance of a pulse to the movable contact arm 132. When a pulse appears, a particular one of the transistors 146 through 156 is controlled so that the signal from the 5-megacycle oscillator is attenuated in accordance with the particular value of one of the resistors 182 through 192. Therefore, the output from the 5-megacycle oscillator is notched in accordance with the position of the movable contact 132.

In order to insure that the carrier is notched an equal amount from both sides of the carrier envelope, a capacitor 212 is used in combination with the capacitor 208 so that the notching circuit is isolated from the input and output circuitry. In addition, the potentiometer 172 is adjusted so that the bias applied to the emitters of the transistors 146 to 156 is such that the output from the notching circuit is balanced.

The notched signal produced from the oscillator and the notching circuit so as to simulate a video signal having dropouts is coupled through an emitter follower circuit to an output terminal 214. The emitter follower circuit includes a transistor 216 and an input resistive circuit including resistors 218, 220 and 222. Bias resistor 224 and output resistor 226 are used in combination with capacitor 228 so as to complete the output circuit for the emitter follower. The output signal from the calibrator of FIG. 2 therefore produces a notched signal which represents a video signal including dropouts and wherein the repetition rate of the dropouts is adjusted using movable contact 112 and the depth of the dropout is adjusted using movable contact 132. This calibrator circuit may, therefore, be used to precisely calibrate the tape quality indicator of the present invention.

Because variations in the amplitude of the signal from the magnetic tape 10 may cause an improper operation of the tape quality indicator, it is desirable to have a relatively constant amplitude signal applied to the tape quality indicator of the present invention. Therefore, the AGC circuit 30 is used as shown in FIG. 1 and the AGC circuit is illustrated in more detail in FIG. 3. In FIG. 3, the AGC circuit includes a coupling capacitor 250 which couples the input signal from the switch 18 shown in FIG. 1 through a ladder attenuator including resistors 252, 254 and 256 and a pair of field-effect transistors 258 and 260 which operate as variable resistors.

The output from the ladder attenuator is coupled through an amplifier 262 which is adjustable to set the loop gain and output amplitude of the signal. The output signal from the amplifier 262 is coupled through an output coupling capacitor 264 and the actual output is taken across a T-pad including resistors 266, 268 and 270. The output signal from the amplifier 262 after being coupled through the capacitor 264 is fed back to control the field-effect transistors 258 and 260. Specifically, the output signal is fed back through a resistor 274, a diode 276 and a capacitor 278 which components rectify and filter the output from the amplifier 262. The feedback signal, therefore, is in representation of the amplitude of the output signal from the amplifier 262.

The feedback signal is then coupled to the base of a transistor 280 and resistor 282 is used to bias the base of the transistor 280 in accordance with the feedback signal. A capacitor 284 is coupled between the base of the transistor 280 and the collector of the transistor 280 and the collector of the transistor 280 is also coupled to the field-effect transistors 258 and 260. The capacitor 284, in combination with the transistor 280, operates as a Miller integrator to control the input to the field-effect transistors 258 and 260. The field-effect transistors 258 and 260 receive a bias voltage supplied by a source of minus voltage through a resistor 286. A capacitor 288 filters the source of minus voltage. The resistance of the field-effect transistors 258 and 260 is controlled so as to provide for a variable ladder attenuator circuit to vary the amplitude of the signal applied to the amplifier 262. It may, therefore, be seen that the output signal is stabilized as to amplitude by the circuit of FIG. 3.

The output from the AGC circuit is then supplied to the detector 32 as shown in FIG. 1. As indicated above, the detector may be the type shown in copending application Ser. No. 507,210 and may include a duration control 42 which controls the minimum duration for the dropout which is to be detected. Also, a sensitivity control 40 may be included to determine a minimum level for the dropout below the input signal before the dropout is to be detected. For example, the calibrator of FIG. 2 may be applied through the switch 18 and the movable contact 132 may be positioned to the desired db point for the dropout. Therefore, signals are applied to the detector 32 having dropouts of a particular level. The sensitivity control 40 may be adjusted so that the detector just detects those dropouts. This detection may be indicated by an energizgation of the lamp 38 in FIG. 1 in a manner to be explained later. The detector 32 would, therefore, detect dropouts having a minimum level below the signal level and all levels greater than that minimum level. This allows the individual operator to set his desired level for the detection of dropouts. The output from the detector 32 is applied to a chart driver 34 which is illustrated in greater detail in FIG. 4.

Figure 4:
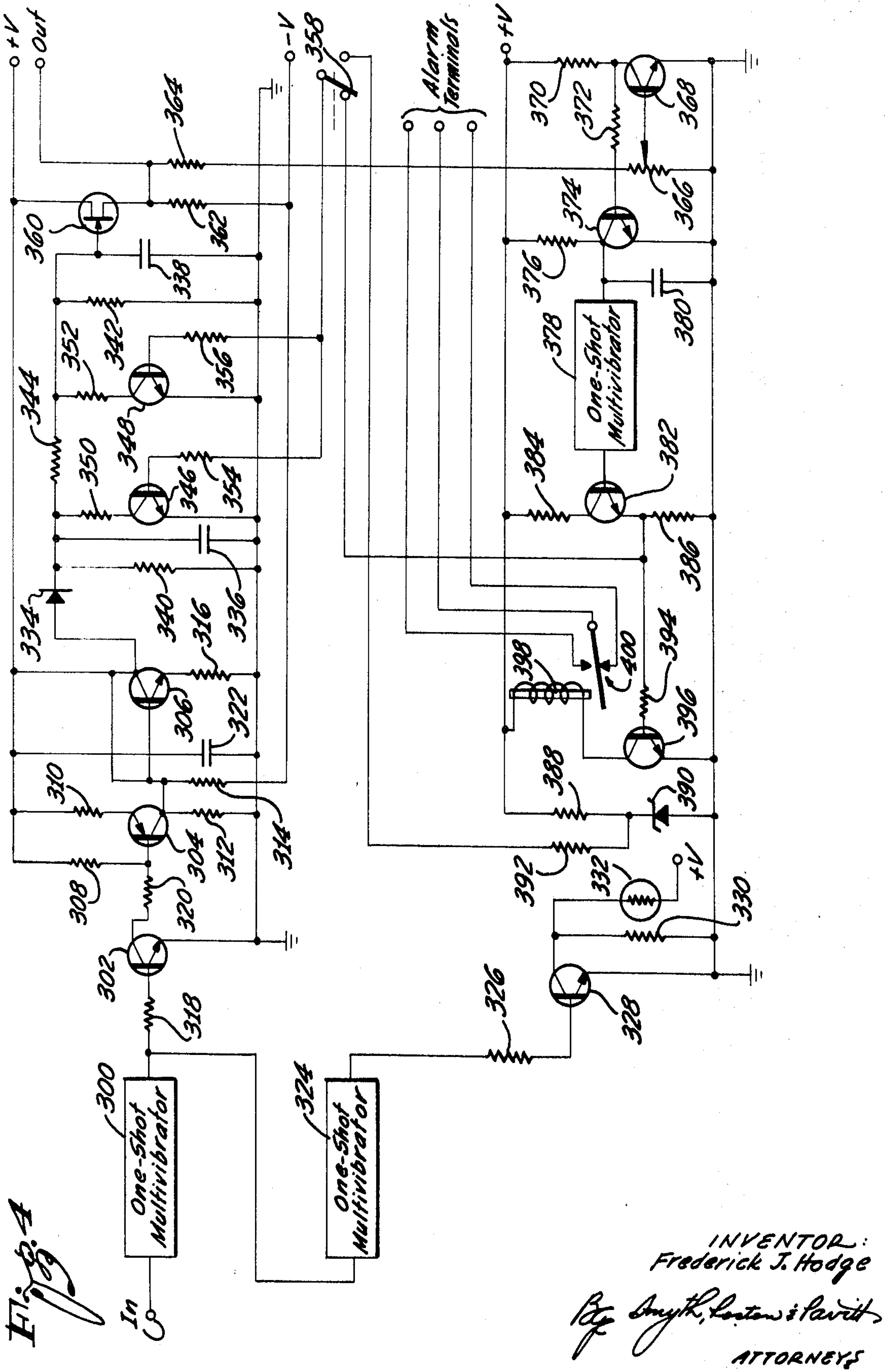
FIG. 4 is a schematic drawing of the chart driver portion of the block diagram of FIG. 1.

In FIG. 4, the input which is taken from the detector 32 shown in FIG. 1 is applied to a one-shot multivibrator 300. When the input through the switch 18 shown in FIG. 1 is from the tape 10, the various dropouts have different duration, depending upon the actual duration of the dropout. The one-shot multivibrator 300 provides an output signal having a series of pulses in accordance with the number of dropouts but with each pulse having a fixed duration.

The output from the one-shot multivibrator 300 is coupled to a circuit for providing constant current pulses which circuit includes transistors 302, 304 and 306. Bias and output resistors 308, 310, 312, 314 and 316 are used with the transistors 302, 304 and 306. Resistors 318 and 320 provide for resistance coupling from the one-shot multivibrator 300 and between the transistors 302 and 304. Capacitor 322 provides for a filtering of the voltage supplied from the plus source of constant voltage. It is also to be noted that the resistor 314 is coupled to a minus source of constant voltage. The output from the transistor 306 is a constant current pulse with each pulse having a fixed duration.

The one-shot multivibrator 300 is variable so that the width of the pulses supplied to the circuit for producing constant current pulses is adjustable. The output of the one-shot multivibrator 300 is also coupled to a second one-shot multivibrator 324. No matter to what width the multivibrator 300 is adjusted, the one-shot multivibrator 324 produces a train of pulses in accordance with the pulses from the one-shot multivibrator 300, but having a constant width.

The output from the one-shot multivibrator 324 is coupled through a resistor 326 to the base of the transistor 328. A resistor 330 is coupled between the collector of the transistor 328 and a reference potential such as ground. The collector of the transistor 328 is also coupled through a light source 332 to a source of positive voltage. It can be seen, therefore, that when the transistor 328 is off, the light source 332 receives a supply of current which passes through the light source 332 and the resistor 330.

The resistor 330 has a value which is large enough so that the current through the light source 332 is not sufficient to provide a visual output indication. However, the current is sufficient to keep the light source 332 at a level just below that necessary to provide for a visual indication. When the one-shot multivibrator 324 fires in accordance with output pulses from the one-shot multivibrator 300, the transistor 328 is turned on to short out the resistor 330. At this time, a much larger current flows through the light source 332 to produce a visible output indication. Since the light source 332 previously had a current almost sufficient to light the light source 332, the output indication when the transistor 328 is turned on is provided very rapidly.

The constant current source pulses supplied from the transistor 306 are coupled through a diode 334 which acts as a gate to allow pulses only to flow in one direction. The constant current pulses are then coupled into a double integrating circuit including a pair of capacitors 336 and 338, a pair of resistors 340 and 342, a resistor 344 and a pair of transistors 346 and 348. The transistors 346 and 348 operate as a clamping circuit to discharge the capacitors 336 and 338. Resistors 350 and 352 are included in the collector circuit of the transistors and resistors 354 and 356 are included in the base circuit of the transistors.

When a voltage appears at the base of the transistors 346 and 348, the transistors are turned on so as to discharge the capacitors. It can be seen that the base of the transistors 346 and 348 are coupled through the resistors 354 and 356 to a reset switch 358. The reset switch is normally in the position shown to provide for automatic reset when the level of dropouts exceeds a particular predetermined rate. In addition, the reset switch 358 may be activated to the opposite position to provide for a manual reset.

As the pulse signal is applied to the one-shot multivibrator 300 from the detector shown in FIG. 1, as indicated above, the one-shot multivibrator and the circuitry including the transistors 302, 304 and 306 provide for pulses of a fixed duration and at a constant current in representation of the dropouts. These constant current pulses are applied to the capacitor 336 and also to the capacitor 338 through the resistor 344. Since the pulses are at a constant current, the charging of the capacitor 336 is linear. The RC time constant of the charging circuit, including the capacitor 336, is determined mainly by the value of the capacitor 336. Therefore, the slope of the charge on the capacitor 336 is directly dependent upon the pulse rate of the constant current pulses.

The capacitor 338 is charged in accordance with the constant current pulses supplied to the capacitor 338 through the resistor 344, but, in addition, the capacitor 338 is also charged in accordance with the charge on the capacitor 336. The RC time constant of the resistor 334 and the capacitor 338 is chosen to approximate the learning time as indicated above. In addition, the charge time for the capacitor 338 is in accordance with the charge on the capacitor 336 which is dependent upon the repetition rate of the dropouts. Therefore, the charge time of the capacitor 338 is a variable and is normally adjusted to fall within 10 to 20 seconds.

The discharge time of the capacitor 338 is determined in accordance with the particular values of the capacitor 338 and the resistor 342. The discharge time is chosen to approximate the forgetting time and is varied in accordance with the repetition rate of the dropout. The discharge time normally varies between 14 and 30 seconds.

The output from the double integral circuit is taken across the capacitor 338 and applied to a field-effect transistor 360 which operates as an impedance matching device. The output signal supplied to the field-effect transistor 360 has a charging rate which is related to the learning time for an average viewer and, as indicated above, this rate typically varies between 10 and 20 seconds. The output applied to the field-effect transistor 360 has a discharging rate which is related to the forgetting time for the average viewer and this typically has a value between 14 and 30 seconds.

The output from the field-effect transistor 360 is taken across resistor 362 to an output terminal. This output signal is fed to a chart recorder 36 as shown in FIG. 1 to provide a permanent record of the dropout rate on an instantaneous continuous basis. It can be seen that the output signal represents the dropout rate on an instantaneous basis since the capacitors forming the double integral circuit are constantly being charged at a rate in accordance with the instantaneous rate of the dropouts. In addition, the circuit includes means to provide compensation for the subjective nature of the particular viewer in that the average viewer has a learning and forgetting time.

When the dropout rate exceeds a predetermined level, this charges the capacitors to a relatively high value and it may take a considerably long period of time for the capacitors to be discharged. This does not accurately reflect actual conditions since the average viewer tends to forget dropouts which occurred more than 30 seconds before. Also, the quality of the tape subsequent to the high dropout rate is masked. The tape quality indicator of the present invention, therefore, includes means to automatically reset by discharging the capacitors 336 and 338 so that an improper output indication is not present on the chart recorder 36 shown in FIG. 1.

The resetting signal is taken across the resistor 362 which is, of course, the output signal and is applied through a resistor 364 to a potentiometer 366. An output arm of the potentiometer 366 is coupled to the base of a transistor 368. The position of the arm of the potentiometer 366 determines the level at which the reset is activated. The transistor 368 includes a bias resistor 370 and the output from the transistor 368 is coupled through a resistor 372 to the base of a transistor 374. The transistor 374 includes output resistor 376.

The output from the transistor 374 is coupled to a one-shot multivibrator 378. Capacitor 380, provided between the collector of the transistor 374 and the reference potential such as ground, eliminates unwanted high-frequency signals. When an output signal of a predetermined value appears at the base of the transistor 368, the transistor 368 is turned on, which in turn turns on transistor 374. A signal is then applied to the one-shot multivibrator 378 to produce an output pulse of a predetermined width. This pulse is applied to a transistor 382 which is connected as an emitter follower. Resistors 384 and 386 complete the emitter-follower circuit.

The output from the emitter follower is then coupled back through the switch 358 which is normally in the position shown to turn on transistors 346 and 348 to clamp the double integrator circuit. This clamping provides for an automatic reset. In order to provide for a manual reset, a voltage is provided by resistor 388 and a Zener diode 390 which operates as a voltage regulator. The voltage is supplied to the switch 358 through a resistor 392. It can be seen, therefore, that the voltage across the Zener diode 390 is coupled through the resistor 392 to the switch and when the switch is energized to the position opposite to that shown in FIG. 4, the transistors 346 and 348 are turned on to clamp the double integrator circuit.

In addition to the above, it is sometimes desirable to provide for an additional output indication when the rate of the dropouts exceeds the predetermined value, which value is set by the movable arm of the potentiometer 366. When the double integrator circuit is clamped in accordance with an output signal at the emitter follower including the transistor 382, the output signal is also coupled through a resistor 394 to the base of the transistor 396. The transistor 396 is turned on in accordance with the output signal at its base and when the transistor 396 is turned on, current is supplied to a solenoid 398 which controls a switch 400. As can be seen in FIG. 4, the switch 400 has a normally closed position and a normally open position when the solenoid 398 is energized. The output alarm terminals may, therefore, be used to supply an additional signal which warns the operator that the dropouts have exceeded a predetermined rate. This additional signal, for example, may be used to provide a cue mark on the tape so that this portion of the tape can be removed.

The present invention, therefore, provides for a tape quality indicator which operates in accordance with the subjective impact of dropouts on an average viewer. It provides a continuous instantaneous graphic record of the dropouts as modified by the learning and forgetting times for the average viewer. It incorporates an automatic reset to reset the double integrating circuit when the dropout rate exceeds a predetermined value and the tape quality indicator has additional features as described above.

Although the tape quality indicator of the present invention has been described with reference to a particular embodiment, it is to be appreciated that various adaptations and modifications may be made and that the invention is only to be limited by the appended claims.

What is claimed is:

1. A magnetic medium quality indicator for producing an output indication of the subjective effect of dropouts occurring in information reproduced from the magnetic medium, including:
   first means for detecting dropouts in the information reproduced from the magnetic medium,
   second means operatively coupled to the first means for producing pulses in response to the dropouts occurring in the information reproduced from the magnetic medium, and
   integrating means operatively coupled to the second means and responsive to the pulses produced by the second means for producing a charge of the integrating means in accordance with the average buildup of annoyance of the dropouts and which integrating means has a charge time varying between first particular times in accordance with the pulse rate of the pulses produced by the second means and for producing a discharging of the integrating means in accordance with the average forgetting of the dropouts and which integrating means has a discharging time varying between second particular times in accordance with the pulse rate of the pulses produced by the second means.

2. The magnetic medium quality indicator of claim 1 wherein the second means produces pulses of a fixed duration.

3. The magnetic medium quality indicator of claim 1 additionally including calibrator means for supplying a calibrating signal to the first means wherein the calibrating signal includes dropouts at a particular rate and amplitude.

4. The magnetic medium quality indicator of claim 1 additionally including reset means for rapidly discharging the integrating means when the integrating means becomes charged to a particular value.

5. A magnetic tape quality indicator for producing an output indication of the quality of the tape in accordance with the number of dropouts occurring in information reproduced from the magnetic tape, including:
   first means responsive to the dropouts occurring in information reproduced from the magnetic tape for producing a pulse signal having pulses in accordance with the number of dropouts,
   integrating means operatively coupled to the first means and responsive to the pulse signal and with the integrating means having a charge level in accordance with the pulses in the pulse signal and with the integrating means normally charging and discharging at predetermined rates, and
   reset means operatively coupled to the integrating means for rapidly discharging the integrating means when the charge level of the integrating means exceeds a predetermined charge level.

6. The magnetic tape quality indicator of claim 5 wherein the pulse signal has constant current pulses of a fixed duration.

7. The magnetic tape quality indicator of claim 5 wherein the integrating means becomes charged at a charge time varying between approximately 10 and 20 seconds which is a function representing to an individual the subjective impairment produced by the dropouts in the quality of the tape and becomes discharged at a discharging time varying between approximately 14 and 30 seconds which is a function representing to such individual the subjective tendency of the individual to forget previous dropouts.

8. The magnetic tape quality indicator of claim 5 additionally including means to produce an output signal when the reset means rapidly discharges the indicating means.

9. A magnetic video tape quality indicator for producing an output indication in accordance with the subjective impairment of video tape reproduction resulting from dropouts, including:
   first means responsive to the video tape reproduction for producing an output signal having characteristics in accordance with the dropouts in the video tape reproduction,
   integrating means operatively coupled to the first means and responsive to the output signal and with the integrating means having a charge level in accordance with the characteristics of the output signal, the charge rate of the integrating means and the discharging rate of the integrating means and wherein the charge rate of the integrating means varies between first particular times which represent to an individual the time for building up the annoyance resulting from dropouts and the discharge rate varies between second particular times which represent to such individual the time for forgetting the annoyance resulting from dropouts, and
   output means responsive to the charge level of the integrating means for producing an output indication in accordance with the charge level of the integrating means.

10. The magnetic video tape quality indicator of claim 9 wherein the first means produces pulse signals having substantially constant currents.

11. The magnetic video tape quality indicator of claim 9 wherein the output means includes a chart recorder for producing a graphic record of the charge level of the integrating means.

12. A magnetic medium quality indicator for producing an output indication of the subjective effects of dropouts occurring in information reproduced from the magnetic medium, including:

first means for detecting dropouts of at least a particular medium duration in the information reproduced from the magnetic medium, second means operatively coupled to the first means for producing pulse signals having substantially constant currents in response to the dropouts occurring in the information reproduced from the magnetic medium, and integrating means operatively coupled to the second means and responsive to the pulse signals produced by the second means for producing a charging of the integrating means in accordance with such pulse signals and at a rate varying between first particular times which represent to an individual the average time for building up the annoyance resulting from the dropouts and for producing a discharge of the integrating means at a rate varying between second particular times which represent to such individual the average time for forgetting the dropouts previously occurring in the tape.

13. The magnetic medium quality indicator of claim 13 wherein the minimum duration for the dropout to be detected is approximately 5 microseconds.

14. The magnetic medium quality indicator of claim 13 wherein the average buildup time of annoyance is 16 seconds and the maximum forgetting time is 30 seconds.

15. A magnetic tape quality indicator for producing an output indication of the quality of the tape in accordance with the number of dropouts occurring in information reproduced from the magnetic tape, including:

detecting means responsive to the dropouts having at least a particular minimum duration in the information reproduced from the magnetic tape, first means operatively coupled to the detecting means for producing a pulse signal having a repetition rate in accordance with the repetition rate of the dropouts, integrating means operatively coupled to the first means and responsive to the pulse signal for producing a charge at a level in accordance with the repetition rate of the pulse signal and with the integrating means normally charging at a particular rate varying between first particular times which represent to an individual the buildup of annoyance resulting from the dropouts and normally discharging at a particular rate varying between second particular times which represent to such individual the forgetting of previous dropouts after a period of time, and reset means operatively coupled to the integrating means for rapidly discharging the integrating means when the charge of the integrating means exceeds a particular level.

16. The magnetic tape quality indicator of claim 15 wherein the integrating means includes a pair of capacitors formed in a double integrating circuit.

17. A magnetic video tape quality indicator for producing an output indication in accordance with the subjective impairment of video tape reproduction resulting from dropouts, including:

detector means responsive to the video tape reproduction for producing an output signal having characteristics in accordance with the dropouts in the video tape reproduction, integrating means operatively couples to the detector means and responsive to the output signal and including a first capacitor and a second capacitor and with the first capacitor having a first charge level in accordance with the characteristics of the output signal and with the second capacitor receiving a charge in accordance with the characteristics of the output signal and the charging of the first capacitor varying between first particular times which represent the time for building up the annoyance to a viewer as a result of the dropouts in the tape and with the second capacitor becoming discharged at a rate varying between second particular times which represent the time in which the viewer forgets dropouts previously occurring on the tape, and output means responsive to the charge level of the second capacitor in the integrating means for producing an output indication in accordance with such charge level.

18. The magnetic video tape quality indicator of claim 17 wherein the average impairment buildup time is approximately 16 seconds and the maximum forgetting time is approximately 30 seconds.

19. The magnetic video tape quality indicator of claim 17 additionally including means for automatically discharging the first and second capacitors when the charge on the second capacitor reaches a predetermined level.

20. A method of producing an output indication of the subjective effect of dropouts occurring in information reproduced from the magnetic medium, including the following steps:

detecting dropouts in the information reproduced from the magnetic medium, producing pulses in response to the dropouts occurring in the information reproduced from the magnetic medium, and producing an increasing level of indication in accordance with the pulse signal and at a particular rate varying between first particular times which represents to a viewer the buildup of annoyance of the dropouts and providing a decreasing level for the indication at a rate varying between second particular times which represents to the viewer the time for forgetting the dropouts.

21. The method of claim 20 wherein the pulses have substantially constant currents.

22. The method of claim 20 wherein the level of indication results from a double interaction of the particular rate.

23. A method of producing an output indication of the quality of the tape in accordance with the number of dropouts occurring in information reproduced from the magnetic tape including the following steps:

detecting dropouts occurring in information reproduced from the magnetic tape, producing a pulse signal having pulses in accordance with the number of dropouts, integrating the pulse signal and producing a charge level in accordance with the pulses in the pulse signal and in accordance with predetermined charge and discharge rates, and rapidly discharging the charge when the charge level exceeds a predetermined value.

24. The method of claim 23 wherein the predetermined charge rate varies between approximately 10 and 20 seconds which represents to a viewer the time for building up the annoyance resulting from the dropouts and the predetermined discharge rate varies between approximately 14 and 30 seconds which represents to the viewer the time for forgetting previously occurring dropouts.

25. The method of claim 23 wherein the step of integrating produces a double integral.

26. A method of producing an output indication in accordance with the subjective impairment of video tape reproduction resulting from dropouts including the following steps:

producing an output signal having characteristics in accordance with the dropouts in the video tape reproduction, providing an integration of the output signal to produce a charge level in accordance with the characteristics of the output signal, the charge rate of the integrating means and the discharging rate of the integrating means and wherein the charge rate of the integrating means varies between which represent to a viewer buildup of annoyance as a result of the dropouts and the discharge rate varies between second particular times which represent to the viewer the time for forgetting the annoyance resulting from previously occurring dropouts, and producing an output indication in accordance with the charge level of the integration.

27. The method of claim 26 wherein the output indication is a graphic record.

References Cited

UNITED STATES PATENTS 2,922,106 1/1960 Oates et al. ---------- 324—34

FOREIGN PATENTS 1,066,472 4/1967 Great Britain.

ALFRED E. SMITH, Primary Examiner

U.S. Cl. X.R.

179—100.2